(12) United States Patent
Machida et al.

(10) Patent No.: US 8,772,697 B2
(45) Date of Patent: Jul. 8, 2014

(54) PHOTODETECTOR DEVICE

(75) Inventors: Satoshi Machida, Chiba (JP); Toshiyuki Uchida, Chiba (JP); Yuji Wakabayashi, Chiba (JP)

(73) Assignee: Seiko Instruments Inc., Chiba (JP)

( * ) Notice: Subject to any disclaimer, the term of this patent is extended or adjusted under 35 U.S.C. 154(b) by 225 days.

(21) Appl. No.: 13/553,109

(22) Filed: Jul. 19, 2012

(65) Prior Publication Data

US 2013/0020472 A1 Jan. 24, 2013

(30) Foreign Application Priority Data

Jul. 20, 2011 (JP) ................................. 2011-159189

(51) Int. Cl.
*G01J 1/44* (2006.01)
(52) U.S. Cl.
USPC .................................... 250/208.1; 250/214 A
(58) Field of Classification Search
USPC ..................... 250/208.1, 208.2, 214 R, 214 A
See application file for complete search history.

(56) References Cited

U.S. PATENT DOCUMENTS

| | | | |
|---|---|---|---|
| 7,750,278 B2 * | 7/2010 | Oike et al. | 250/208.1 |
| 2010/0253616 A1 * | 10/2010 | Omi et al. | 345/102 |
| 2010/0259570 A1 | 10/2010 | Omi et al. | |

* cited by examiner

*Primary Examiner* — Tony Ko
(74) *Attorney, Agent, or Firm* — Brinks Gilson & Lione

(57) ABSTRACT

Provided is a photodetector device for detecting light intensity based on a detection signal of a difference circuit, the photodetector device including: a first light receiving element which generates an electric charge based on incident light; a second light receiving element, which includes a light blocking part for blocking incident light and generates an electric charge being a reference; and a storage detection circuit for detecting that an output voltage of the first light receiving element or the second light receiving element has reached a predetermined potential and outputting the detection signal when the difference does not reach a predetermined value even though sufficient incident light is provided.

2 Claims, 4 Drawing Sheets

PHOTODETECTOR DEVICE

RELATED APPLICATIONS

This application claims priority under 35 U.S.C. §119 to Japanese Patent Application No. 2011-159189 filed on Jul. 20, 2011, the entire content of which is hereby incorporated by reference.

BACKGROUND OF THE INVENTION

1. Field of the Invention

The present invention relates to a semiconductor photodetector device, and more particularly, to a technology of measuring an amount of incident light with use of a photodiode.

2. Description of the Related Art

FIG. 3 illustrates a circuit diagram of a conventional semiconductor photodetector device.

The conventional semiconductor photodetector device includes a photodetection section and a counter section.

The photodetection section includes first and second photodiodes 1 and 2, which serve as light receiving elements, first and second storage means 12 and 13, switches 6 and 7, a reference voltage circuit 8a, amplifiers 3 and 4, a difference circuit 5, a clamp capacitor 20, a switch 11, a reference voltage circuit 8b, a comparator 9, and a control circuit 10. The switch 11 and the reference voltage circuit 8b initialize an electric charge of the clamp capacitor 20. The control circuit 10 controls the respective switches in response to reception of an output voltage Vcomp of the comparator 9.

The counter section includes an oscillating circuit 14, a clock shaping circuit 15, first and second counters 16 and 17, a counter reset circuit 18, and a register 19.

The first photodiode 1 is provided with means for blocking infrared light, and generates an electric charge based on incident visible light. The second photodiode 2 is provided with light blocking means for blocking incident light, and generates an electric charge being a reference. The first storage means 12 stores the electric charge generated in the first photodiode 1. The second storage means 13 stores the electric charge generated in the second photodiode 2. The switches 6 and 7 and the reference voltage circuit 8a reset the electric charges stored in the first storage means 12 and the second storage means 13. The difference circuit 5 outputs a voltage based on a difference between the electric charge stored in the first storage means 12 and the electric charge stored in the second storage means 13. The clamp capacitor 20 stores the difference voltage output from the difference circuit 5. The switch 11 and the reference voltage circuit 8b initialize the electric charge of the clamp capacitor 20. The comparator 9 compares a voltage Vout generated based on the difference and a reference voltage Vrefc of a reference voltage circuit 8c, and outputs the voltage Vcomp. That is, when the voltage based on the difference between the electric charge generated based on visible light entering the first photodiode 1 and the electric charge of the second photodiode 2, which is the reference, exceeds the reference voltage Vrefc, the voltage Vcomp is inverted from LOW (Lo) to HIGH (Hi). The control circuit 10 generates a reset signal R and a clamp signal CL in response to reception of the voltage Vcomp output from the comparator 9, and controls the respective switches by those signals.

The oscillating circuit 14 and the clock shaping circuit 15 output a signal TBCLK and a clamp signal CL in response to reception of the clamp signal CL output from the control circuit 10. The signal TBCLK is a signal that is output as a signal of the oscillating circuit 14 only during a period in which the clamp signal CL is Lo. The first counter 16 counts the signal TBCLK, and outputs a signal TBASE1 when the count reaches a predetermined count value. That is, the first counter 16 measures a period in which the photodiodes 1 and 2 store the electric charges based on a frequency of the oscillating circuit. The second counter 17 counts the clamp signal CL, and outputs a count value. That is, the second counter 17 measures the number of cycles of charging and discharging, which are performed by the photodiodes 1 and 2.

FIG. 4 is a timing chart illustrating normal operation of the semiconductor photodetector device.

When a period TBASE is started in the semiconductor photodetector device, the control circuit 10 causes the reset signal R and the clamp signal CL to be Hi.

With this, the switches 6 and 7 are turned ON and the voltages of the photodiodes 1 and 2 are reset to a reference voltage Vrefa. Further, the switch 11 is turned ON and the output of the difference circuit 5 is reset to a reference voltage Vrefb. Then, after the elapse of a predetermined delay time, the control circuit 10 causes the reset signal R to be Lo to turn OFF the switches 6 and 7, and thus the charging of the photodiodes 1 and 2 is started. In the storage period, an output voltage VDI1 of the photodiode 1 decreases in proportion to the amount of incident visible light. Further, the photodiode 2 is shielded from light, and hence an output voltage VDI2 of the photodiode 2 does not decrease.

After the elapse of a period α, the control circuit 10 causes the clamp signal CL to be Lo to turn OFF the switch 11 so that the difference circuit 5 outputs the difference (voltage Vout) to the comparator 9.

The voltage Vout output from the difference circuit 5 gradually increases to reach the reference voltage Vrefc within a difference output period Ts. The difference output period Ts becomes shorter as the visible light intensity is larger.

When the voltage Vout is smaller than the reference voltage Vrefc, the comparator 9 causes the output voltage Vcomp to be Lo, but when the voltage Vout reaches the reference voltage Vrefc within the difference output period Ts, the comparator 9 causes the output voltage Vcomp to be Hi.

When the output voltage Vcomp becomes Hi, the control circuit 10 causes the reset signal R and the clamp signal CL to be Hi, and delays the output signal Vcomp to maintain the Hi state for a predetermined period.

When the reset signal R and the clamp signal CL become Hi, the switches 6, 7, and 11 are turned ON, and the photodiodes 1 and 2 are reset. Thus, the voltage Vout decreases to become the reference voltage Vrefb.

After that, the reset signal R becomes Lo, and subsequently, the clamp signal CL becomes Lo, and then the same operation is repeated.

As described above, the charging and reset of the photodiodes 1 and 2 are repeated, and the difference output period Ts becomes shorter as the visible light intensity is larger.

However, when light containing a large amount of infrared light, such as light of an incandescent bulb, enters the conventional semiconductor photodetector device, or when abnormally intense light enters the conventional semiconductor photodetector device, the conventional semiconductor photodetector device has the following defects.

Depending on the structure of the package of the semiconductor photodetector device, light enters a semiconductor chip from a side surface thereof, and hence a large number of minority carriers are generated in the semiconductor substrate. At this time, due to the minority carriers reaching junction portions between the substrate and the photodiodes 1 and 2, the output voltages VDI1 and VDI2 of the photodiodes 1 and 2 decrease.

When light containing a large amount of infrared light or abnormally intense light enters the semiconductor photodetector device, a reduction amount of the output voltage of the photodiode due to the minority carriers generated by the infrared light or visible light entering the semiconductor chip from the side surface thereof becomes larger in ratio than a reduction amount of the output voltage of the photodiode due to visible light entering the semiconductor chip from the front surface thereof. Therefore, the output voltage VDI1 of the photodiode 1 and the output voltage VDI2 of the photodiode 2 decrease under a state in which the difference therebetween is small. The output voltage VDI1 of the photodiode 1 can decrease only until the junction of the photodiode becomes a forward bias, which is generally about −0.3 V. Therefore, when the reference voltage Vrefa for reset of the photodiodes 1 and 2 is low, the output voltage VDI1 of the photodiode 1 reaches −0.3 V to stop its decrease before the voltage Vout reaches the reference voltage Vrefc. In this case, the output voltage VDI2 of the photodiode 2 further decreases under a state in which the voltage Vout starts decreasing without reaching the reference voltage Vrefc. Therefore, a situation occurs in which the output of the comparator is never inverted during the period TBASE. The semiconductor photodetector device outputs data 0, that is, the detection result shows a dark state even when visible light enters the semiconductor photodetector device.

SUMMARY OF THE INVENTION

In view of the above, the present invention has an object to provide a photodetector device which is capable of outputting a measured value closer to an actual light amount even when light containing a large amount of infrared light or abnormally intense light enters the photodetector device.

In order to solve the conventional problem, a photodetector device according to an exemplary embodiment of the present invention has the following configuration.

The photodetector device includes: a first light receiving element including infrared light blocking means for blocking infrared light; a second light receiving element including light blocking means for blocking incident light; storage means for storing an electric charge generated in the first light receiving element; storage means for storing an electric charge generated in the second light receiving element; a difference circuit for outputting a difference between the electric charge stored in the first light receiving element and the electric charge stored in the second light receiving element; a comparator for detecting that a voltage based on the difference has reached a predetermined voltage and outputting a detection signal; a control circuit for resetting, based on the detection signal, the electric charge stored in the first light receiving element, the electric charge stored in the second light receiving element, and the difference obtained by the difference circuit to initial values, and then causing the storage means for the first light receiving element and the storage means for the second light receiving element to store electric charges again; and a storage detection circuit for outputting the detection signal to the control circuit when an output voltage of one of the first light receiving element and the second light receiving element reaches a predetermined potential.

The photodetector device of the present invention has the configuration in which the storage detection circuit for detecting that the output voltage of the first light receiving element or the second light receiving element has reached the predetermined potential is provided, and in a case where light containing a large amount of infrared light enters the photodetector device, the detection signal is output when the difference does not reach the predetermined value even though sufficient incident light is provided. Therefore, the photodetector device can output the measured value closer to the actual light amount.

DETAILED DESCRIPTION OF THE PREFERRED EMBODIMENTS

Hereinafter, a semiconductor photodetector device according to an embodiment of the present invention is described.

Figure 1:
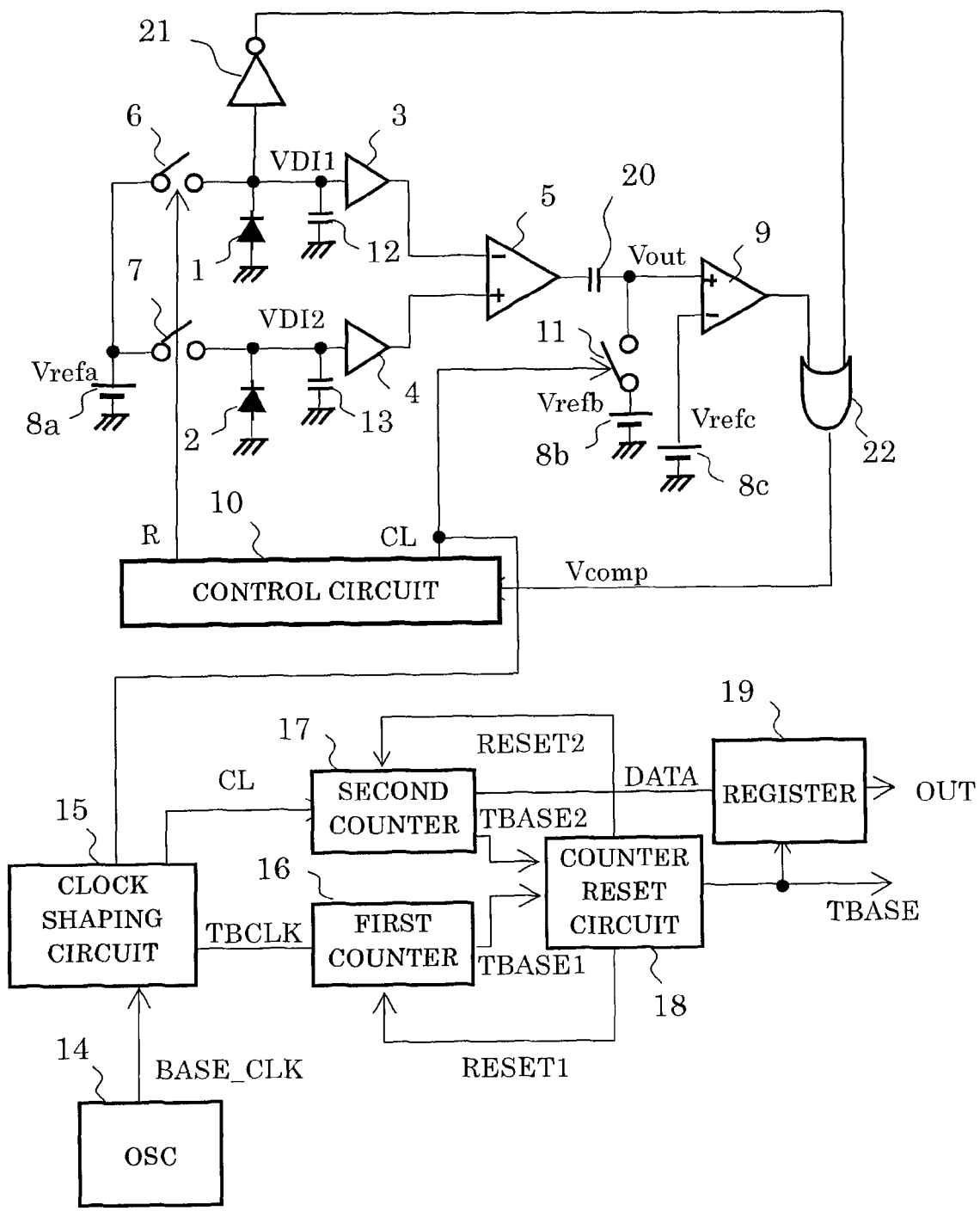
FIG. 1 is a circuit diagram illustrating a semiconductor photodetector device according to an embodiment of the present invention.

FIG. 1 is a circuit diagram illustrating a configuration of a semiconductor photodetector device according to the embodiment of the present invention.

The semiconductor photodetector device according to the embodiment of the present invention includes a photodetection section and a counter section.

The photodetection section includes first and second photodiodes 1 and 2, which serve as light receiving elements, an inverter 21 having an input connected to a cathode of the first photodiode 1, first and second storage means 12 and 13, switches 6 and 7, a reference voltage circuit 8a, amplifiers 3 and 4, a difference circuit 5, a clamp capacitor 20, a switch 11, a reference voltage circuit 8b, a comparator 9, an OR circuit 22 to which an output of the comparator 9 and an output of the inverter 21 are input, and a control circuit 10. The switch 11 and the reference voltage circuit 8b initialize an electric charge of the clamp capacitor 20. The control circuit 10 controls the respective switches in response to reception of a voltage Vcomp which is output from the OR circuit 22.

The counter section includes an oscillating circuit 14, a clock shaping circuit 15, first and second counters 16 and 17, a counter reset circuit 18, and a register 19.

The first photodiode 1 is provided with means for blocking infrared light, and generates an electric charge based on incident visible light. The second photodiode 2 is provided with light blocking means for blocking incident light, and generates an electric charge being a reference. The inverter 21 inverts its output from Lo to Hi when the voltage at the cathode of the first photodiode 1 decreases. That is, the inverter 21 is a storage detection circuit of the electric charge of the first photodiode 1.

The first storage means 12 stores the electric charge generated in the first photodiode 1. The second storage means 13 stores the electric charge generated in the second photodiode 2. The switches 6 and 7 and the reference voltage circuit 8a reset the electric charges stored in the first storage means 12 and the second storage means 13.

The difference circuit 5 outputs a voltage based on a difference between the electric charge stored in the first storage means 12 and the electric charge stored in the second storage means 13. The clamp capacitor 20 stores the difference voltage output from the difference circuit 5. The switch 11 and the reference voltage circuit 8b initialize the electric charge of the clamp capacitor 20.

The comparator 9 outputs a result of comparison between a voltage Vout generated based on the difference and a reference voltage Vrefc of a reference voltage circuit 8c. That is, when the voltage based on the difference between the electric charge generated based on visible light entering the first photodiode 1 and the electric charge of the second photodiode 2, which is the reference, exceeds the reference voltage Vrefc, the output of the comparator 9 is inverted from Lo to Hi.

The control circuit 10 generates a reset signal R and a clamp signal CL in response to reception of the voltage Vcomp, which is the output of the comparator 9 output via the OR circuit 22, and controls the respective switches by those signals. Further, in response to the inversion of the output of the inverter 21, the OR circuit 22 inverts the voltage Vcomp and outputs the inverted output to the control circuit 10.

The oscillating circuit 14 and the clock shaping circuit 15 output a signal TBCLK and a clamp signal CL in response to reception of the clamp signal CL output from the control circuit 10. A delay time α of the clamp signal CL is set longer than a delay time of the reset signal R. The signal TBCLK is a signal that is output as a signal of the oscillating circuit 14 only during a period in which the clamp signal CL is Lo.

The first counter 16 counts the signal TBCLK, and outputs a signal TBASE1 when the count reaches a predetermined count value. That is, the first counter 16 measures a period in which the photodiodes 1 and 2 store the electric charges based on a frequency of the oscillating circuit. The second counter 17 counts the clamp signal CL, and outputs a count value. That is, the second counter 17 measures the number of cycles of charging and discharging, which are performed by the photodiodes 1 and 2.

The counter reset circuit 18 causes a signal TBASE to be Hi when the counter section starts the count of the clamp signal CL, and causes the signal TBASE to be Lo when the first counter 16 outputs the signal TBASE1. Further, the counter reset circuit 18 outputs a reset signal RESET1 to the first counter 16 to reset the count value of the first counter 16, and outputs a reset signal RESET2 to the second counter 17 to reset the count value of the second counter 17 as well. As described above, the counter reset circuit 18 maintains the signal TBASE to Hi until the total of the period in which the difference circuit 5 outputs the difference reaches a predetermined period.

The register 19 is a 16-bit register, and stores the count value output from the second counter 17 during a period in which the signal TBASE is Hi. Then, when the signal TBASE changes to Lo, the register 19 outputs the stored count value as a 16-bit register output. This output corresponds to the number of times of repetition of charging and discharging of the photodiodes 1 and 2 during the TBASE period, and is a value in proportion to the intensity of the incident light.

As described above, the semiconductor photodetector device can measure the intensity of the incident light. Further, the operation of the semiconductor photodetector device at the time of normal operation when light mainly containing visible light enters the semiconductor photodetector device is the same as that shown in the timing chart of the conventional semiconductor photodetector device illustrated in FIG. 4.

When a period TBASE is started in the semiconductor photodetector device, the control circuit 10 causes the reset signal R and the clamp signal CL to be Hi.

With this, the switches 6 and 7 are turned ON and the voltages of the photodiodes 1 and 2 are reset to a reference voltage Vrefa. Further, the switch 11 is turned ON and the output of the difference circuit 5 is reset to a reference voltage Vrefb. Then, after the elapse of a predetermined delay time, the control circuit 10 causes the reset signal R to be Lo to turn OFF the switches 6 and 7, and thus the charging of the photodiodes 1 and 2 is started. In the storage period, an output voltage VDI1 of the photodiode 1 decreases in proportion to the amount of incident visible light. Further, the photodiode 2 is shielded from light, and hence an output voltage VDI2 of the photodiode 2 does not decrease.

After the elapse of the delay time α, the control circuit 10 causes the clamp signal CL to be Lo to turn OFF the switch 11 so that the difference circuit 5 outputs the difference (voltage Vout) to the comparator 9.

The voltage Vout output from the difference circuit 5 gradually increases to reach the reference voltage Vrefc within a difference output period Ts. The difference output period Ts becomes shorter as the visible light intensity is larger.

When the voltage Vout is smaller than the reference voltage Vrefc, the comparator 9 causes the output voltage Vcomp to be Lo, but when the voltage Vout reaches the reference voltage Vrefc within the difference output period Ts, the comparator 9 causes the output voltage Vcomp to be Hi.

When the output voltage Vcomp becomes Hi, the control circuit 10 causes the reset signal R and the clamp signal CL to be Hi, and delays the output signal Vcomp to maintain the Hi state for a predetermined period.

When the reset signal R and the clamp signal CL become Hi, the switches 6, 7, and 11 are turned ON, and the photodiodes 1 and 2 are reset. Thus, the voltage Vout decreases to become the reference voltage Vrefb.

After that, the reset signal R becomes Lo, and subsequently, the clamp signal CL becomes Lo, and then the same operation is repeated.

As described above, the charging and reset of the photodiodes 1 and 2 are repeated, and the difference output period Ts becomes shorter as the visible light intensity is larger.

Next, description is made of operation of the semiconductor photodetector device according to this embodiment when light containing a large amount of infrared light or abnormally intense light enters the semiconductor photodetector device.

Figure 2:
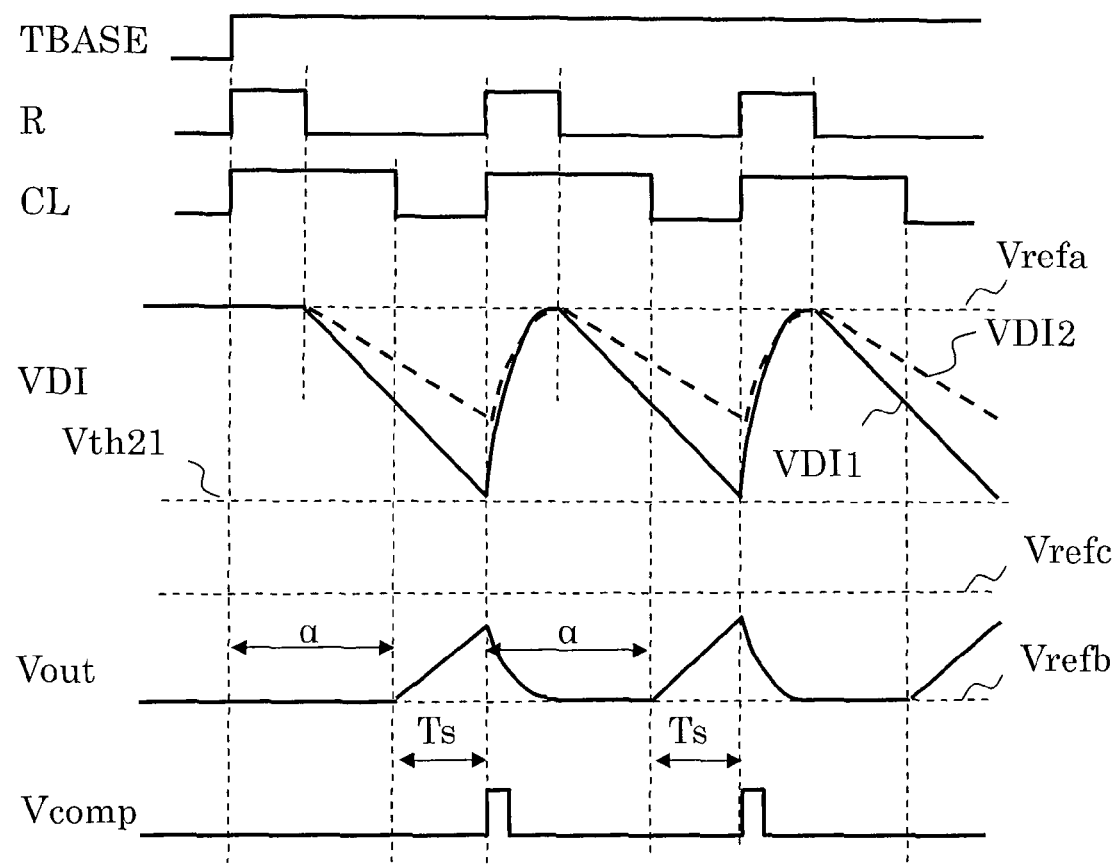
FIG. 2 is a timing chart illustrating operation of the semiconductor photodetector device according to the embodiment of the present invention when light containing a large amount of infrared light or abnormally intense light enters the semiconductor photodetector device.
Figure 3:
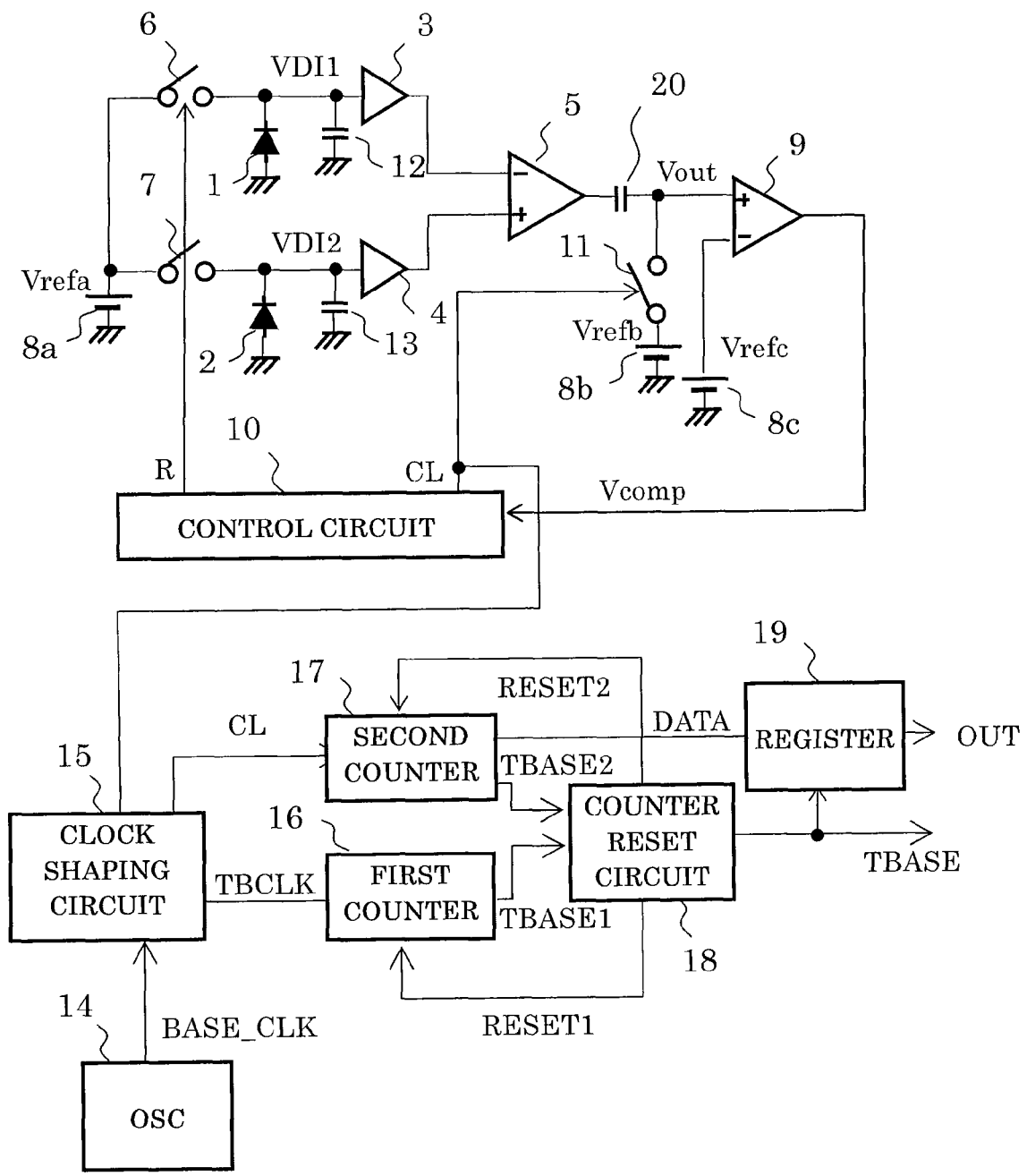
FIG. 3 is a circuit diagram illustrating a conventional semiconductor photodetector device.

FIG. 2 is a timing chart illustrating the operation of the semiconductor photodetector device according to this embodiment when light containing a large amount of infrared light or abnormally intense light enters the semiconductor photodetector device.

Figure 4:
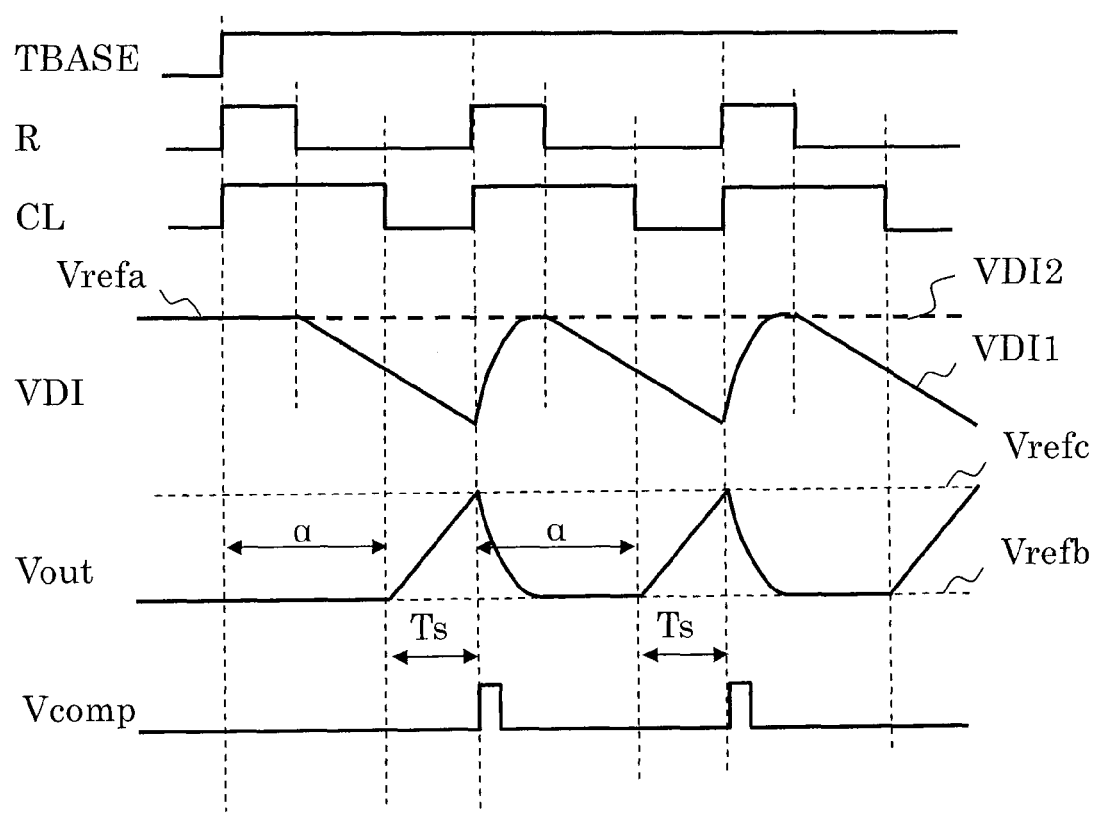
FIG. 4 is a timing chart illustrating normal operation of the conventional semiconductor photodetector device.

Until the start of the storage, the operation is the same as the normal operation that is shown in the timing chart of FIG. 4.

When the reset signal R changes from Hi to Lo to start the storage, in a case where light containing a large amount of infrared light or abnormally intense light enters the semiconductor photodetector device, the output voltage VDI2 of the photodiode 2 decreases fast, and a difference with respect to the decrease of the output voltage VDI1 of the photodiode 1 is small. Therefore, the output voltage VDI1 of the photodiode 1 reaches about −0.3 V before the voltage Vout reaches the reference voltage Vrefc.

In this case, an inversion voltage Vth21 of the inverter 21 is set to, for example, about 0.5 V. Through provision of the inverter 21 to the cathode of the photodiode 1 as described above, the inverter 21 outputs Hi before the output voltage VDI1 decreases to the lowest value. Therefore, the voltage Vcomp output from the OR circuit 22 becomes Hi regardless of the output of the comparator 9.

As described above, through mere addition of a simple circuit to the semiconductor photodetector device, the semiconductor photodetector device of this embodiment can obtain a detection output that is close to a value that is essentially desired even when light containing a large amount of infrared light or abnormally intense light enters the semiconductor photodetector device.

Note that, in this embodiment, the input of the inverter 21 is connected to the cathode of the photodiode 1, but the present invention is not limited thereto. For example, when the inversion voltage Vth21 of the inverter 21 cannot be lowered so much, the cathode of the photodiode 2 may be connected to the input of the inverter 21, and a similar effect may be obtained even in this case. Further, the input of the inverter 21 may be connected to the output of the amplifier 3 or the amplifier 4.

Further, the inverter 21 is not particularly limited as long as the inverter 21 is a circuit capable of detecting the voltage of the cathode of the photodiode.

Further, the first and second storage means 12 and 13 are provided for adjusting the light receiving sensitivity of the photodiodes 1 and 2, and the semiconductor photodetector device of the present invention can detect light even without those first and second storage means 12 and 13.

What is claimed is:

1. A photodetector device for measuring illuminance of visible light, comprising:

a first light receiving element comprising infrared light blocking means for blocking infrared light;

a second light receiving element comprising light blocking means for blocking incident light;

storage means for storing an electric charge generated in the first light receiving element;

storage means for storing an electric charge generated in the second light receiving element;

a difference circuit for outputting a difference between the electric charge stored in the first light receiving element and the electric charge stored in the second light receiving element;

a comparator for detecting that a voltage based on the difference has reached a predetermined voltage and outputting a detection signal;

a control circuit for resetting, based on the detection signal, the electric charge stored in the first light receiving element, the electric charge stored in the second light receiving element, and the difference obtained by the difference circuit to initial values, and then causing the storage means for the first light receiving element and the storage means for the second light receiving element to store electric charges again; and a storage detection circuit for outputting the detection signal to the control circuit when an output voltage of one of the first light receiving element and the second light receiving element reaches a predetermined potential.

2. A photodetector device according to claim 1, wherein the storage detection circuit comprises an inverter to which the output voltage of one of the first light receiving element and the second light receiving element is input.

\* \* \* \* \*